United States Patent
Liang et al.

(10) Patent No.: US 11,226,857 B1
(45) Date of Patent: Jan. 18, 2022

(54) DEVICE, METHOD AND COMPUTER PROGRAM PRODUCT FOR FAULT ELIMINATION OF A MULTILAYER SYSTEM

(71) Applicant: NATIONAL CENTRAL UNIVERSITY, Taoyuan (TW)

(72) Inventors: Deron Liang, Taoyuan (TW); Yen-Lin Lee, Taoyuan (TW); Wei-Jen Wang, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 0 days.

(21) Appl. No.: 17/082,374

(22) Filed: Oct. 28, 2020

(30) Foreign Application Priority Data

Sep. 15, 2020 (TW) ................................ 109131593

(51) Int. Cl.
*G06F 11/07* (2006.01)
*G06F 16/901* (2019.01)
*G06F 13/40* (2006.01)

(52) U.S. Cl.
CPC ........ *G06F 11/079* (2013.01); *G06F 11/0757* (2013.01); *G06F 11/0772* (2013.01); *G06F 13/4068* (2013.01); *G06F 16/9027* (2019.01)

(58) Field of Classification Search
CPC ............... G06F 11/079; G06F 11/0757; G06F 16/9027; G06F 13/4068; G06F 11/1629
See application file for complete search history.

(56) References Cited

U.S. PATENT DOCUMENTS

| 10,901,831 | B1* | 1/2021 | Jain ..................... G06F 11/0706 |
| 2013/0042139 | A1* | 2/2013 | Bhalerao ............. G06F 11/0709 714/2 |
| 2014/0164851 | A1 | 6/2014 | Pelly et al. |
| 2016/0253246 | A1 | 9/2016 | Chow et al. |
| 2020/0012551 | A1 | 1/2020 | Liang et al. |
| 2020/0073755 | A1* | 3/2020 | Strachan ................ G11C 29/52 |

FOREIGN PATENT DOCUMENTS

TW 202006564 A 2/2020

OTHER PUBLICATIONS

Office Action from corresponding Taiwan Application No. 11021096830 dated Nov. 8, 2021, 6 pages.

* cited by examiner

*Primary Examiner* — Matthew M Kim
*Assistant Examiner* — Kyle Emanuele
(74) *Attorney, Agent, or Firm* — Cooper Legal Group, LLC

(57) ABSTRACT

When the inspection unit corresponding to at least one disabled layer of a multilayer system is unavailable, a fault-eliminating device defines the at least one disabled layer and a target layer as a combined layer. The fault dependency of the target layer is the lowest among the fault dependency of the at least one available layer. The inspection unit of the at least one available layer is active and the fault dependency thereof is higher than the disabled layer. Then, the device makes the inspection unit and the fault symptom corresponding to the target layer correspond to the combined layer, so as to update a list of layers and a fault model. After that, the device determines a source of a fault from the layers according to the list of layers and the fault model, and performs a strategy of fault elimination corresponding to the source, to eliminate the fault.

21 Claims, 5 Drawing Sheets

DEVICE, METHOD AND COMPUTER PROGRAM PRODUCT FOR FAULT ELIMINATION OF A MULTILAYER SYSTEM

CROSS-REFERENCES TO RELATED APPLICATIONS

This application claims priority to Taiwan Patent Application No. 109131593, filed on Sep. 15, 2020, which is incorporated herein by reference in its entirety.

BACKGROUND

Technical Field

The present disclosure relates to a device, method and computer program product thereof for fault elimination of a multilayer system. More specifically, the present disclosure relates to a device, method and computer program product thereof for fault elimination, which can still perform fault detection and fault elimination when a specific inspection unit in a multilayer system is unavailable.

Descriptions of the Related Art

A common multilayer system comprises multiple layers, and traditional fault detection and fault elimination mechanisms for the multilayer system mostly detect fault symptoms in each of the layers through an inspection unit corresponding to the layer, and find out the source of the fault accordingly. Due to the characteristic of the structure of the multilayer system (i.e., the higher layers often use the functions provided by the lower layers), the layers therein have fault dependencies (i.e., the fault in one layer with higher fault dependency may be, in fact, caused by the faults of other layers with lower fault dependencies). In this regard, when fault occurs to a layer in a multilayer system, the actual source of the fault may be detected through for example, but not limitation, an algorithm based on a binary-search-tree data structure for detecting faults of the multilayer system, which is described in Taiwan Invention Patent No. I691852 (entitled "Error detecting device and error detecting method for detecting failure of hierarchical system, computer readable recording medium, and computer program product", filed on Jul. 9, 2018, the entirety of which is incorporated herein by reference), and the fault can therefore be eliminated after determining the source of the fault.

However, although the existing mechanisms described above for the multilayer system can detect the source of the fault, it relies on the inspection unit of each of the layers to detect the fault symptom of that layer to determine whether a fault occurs in that layer. Therefore, once the inspection units corresponding to some layers in the multilayer system become unavailable (for example, the inspection units failed or the inspection units used by certain layers cannot be used to detect the fault symptoms of those layers, etc.), the existing mechanisms described above cannot continue to detect the source of the fault, and thus, corresponding strategy of fault elimination cannot be adopted for dealing with the fault.

In view of the above situation, an urgent need exists in the art to detect the source of the fault and eliminate the fault even if some inspection units in the multilayer system are unavailable.

SUMMARY

To at least solve the above problems, the present disclosure provides a fault-eliminating device. The fault-eliminating device may be applied to a multilayer system. The multilayer system comprises a plurality of layers, each of the layers has a fault dependency, and the layers may correspond to a plurality of inspection units. The fault-eliminating device may comprise a storage and a processor electrically connected with the storage. The storage may be configured to store a list of layers and a fault model. The processor may be configured to determine, from the layers, a source of a fault corresponding to the multilayer system according to the list of layers and the fault model, and perform, to the multilayer system, a strategy of fault elimination corresponding to the source, so as to eliminate the fault. When the inspection unit that corresponds to at least one disabled layer of the layers is unavailable, the processor may be further configured to define, in the list of layers, the at least one disabled layer and a target layer as a combined layer, so as to update the list of layers, wherein the fault dependency of the target layer is a lowest among the fault dependency of at least one available layer. The at least one inspection unit corresponding to each of the at least one available layer is active, and the fault dependency of the at least one available layer is higher than the fault dependency of the disabled layer. Moreover, the processor may further make, in the fault model, the inspection unit and a fault symptom corresponding to the target layer correspond to the combined layer, so as to update the fault model.

To at least solve the above problems, the present disclosure further provides a computer program product. An electronic computing device may execute a fault-eliminating method after a plurality of program instructions comprised in the computer program product are loaded into the electronic computing device. The electronic computing device may store a list of layers and a fault model. The fault-eliminating method may be applied to a multilayer system that comprises a plurality of layers, and each of the layers has a fault dependency. The fault-eliminating method may comprise the following steps:

defining, in the list of layers, at least one disabled layer and a target layer as a combined layer when at least one inspection unit corresponding to the at least one disabled layer in the layers is unavailable, so as to update the list of layers, wherein the fault dependency of the target layer is a lowest among the fault dependency of at least one available layer, and at least one inspection unit corresponding to each of the at least one available layer is active, and the fault dependency of the available layer is higher than the fault dependency of the disabled layer;

making, in the fault model, the inspection unit and a fault symptom corresponding to the target layer correspond to the combined layer, so as to update the fault model;

determining, from the layers, a source of a fault of the multilayer system according to the list of layers and the fault model; and performing, to the multilayer system, a strategy of fault elimination corresponding to the source, so as to eliminate the fault.

In order to at least solve the above problems, the present disclosure further provides a fault-eliminating method. The fault-eliminating method may be executed by an electronic computing device, and the electronic computing device may store a list of layers and a fault model. The fault-eliminating method may be applied to a multilayer system that comprises a plurality of layers, and each of the layers has a fault dependency. The fault-eliminating method may comprise the following steps:

defining, in the list of layers, at least one disabled layer and a target layer as a combined layer when at least one inspection unit corresponding to the at least one disabled layer is unavailable, so as to update the list of layers, wherein the fault dependency of the target layer is a lowest among the fault dependency of at least one available layer, and at least one inspection unit of the at least one available layer is active, and the fault dependency of the at least one available layer is higher than the fault dependency of the at least one disabled layer;

making, in the fault model, the inspection unit and a fault symptom corresponding to the target layer correspond to the combined layer, so as to update the fault model;

determining, from the layers, a source of a fault of the multilayer system according to the list of layers and the fault model; and performing, to the multilayer system, a strategy of fault elimination corresponding to the source, so as to eliminate the fault.

According to the above description, the fault-eliminating device, fault-eliminating method and corresponding computer program product for fault elimination provided by the present disclosure update the list of layers and the fault model by defining a combined layer including the target layer with higher fault dependency and the at least one disabled layer when the inspection unit of at least one layer in the multilayer system is unavailable, so that the algorithm for detecting fault of the multilayer system can still be executed, thereby detecting the source of the fault of the multilayer system and eliminating the fault. Accordingly, the device, method and corresponding computer program product for fault elimination provided by the present disclosure indeed solve the above problems in the technical field of the present disclosure.

This summary overall describes the core concept of the present disclosure and covers the problem to be solved, the means to solve the problem and the effect of the present disclosure to provide a basic understanding of the present disclosure by those of ordinary skill in the art. However, it shall be appreciated that, this summary is not intended to encompass all embodiments of the present disclosure but is provided only to present the core concept of the present disclosure in a simple form and as an introduction to the following detailed description. The detailed technology and preferred embodiments implemented for the subject disclosure are described in the following paragraphs accompanying the appended drawings for people skilled in this field to well appreciate the features of the claimed disclosure.

BRIEF DESCRIPTION OF THE DRAWINGS

The drawings can assist the description of the present disclosure, wherein.

DETAILED DESCRIPTION

In the following description, the device, method and corresponding computer program product for fault elimination provided by the present disclosure will be explained with reference to embodiments thereof. However, these embodiments are not intended to limit the present disclosure to any environment, applications or implementations described in these embodiments. Therefore, description of these embodiments is only for purpose of illustration rather than to limit the present disclosure. It should be appreciated that, in the following embodiments and the attached drawings, elements unrelated to the present disclosure are omitted from depiction, and dimensions of and dimensional scales among individual elements in the attached drawings are provided only for illustration, but not to limit the scope of the present disclosure.

Figure 1:
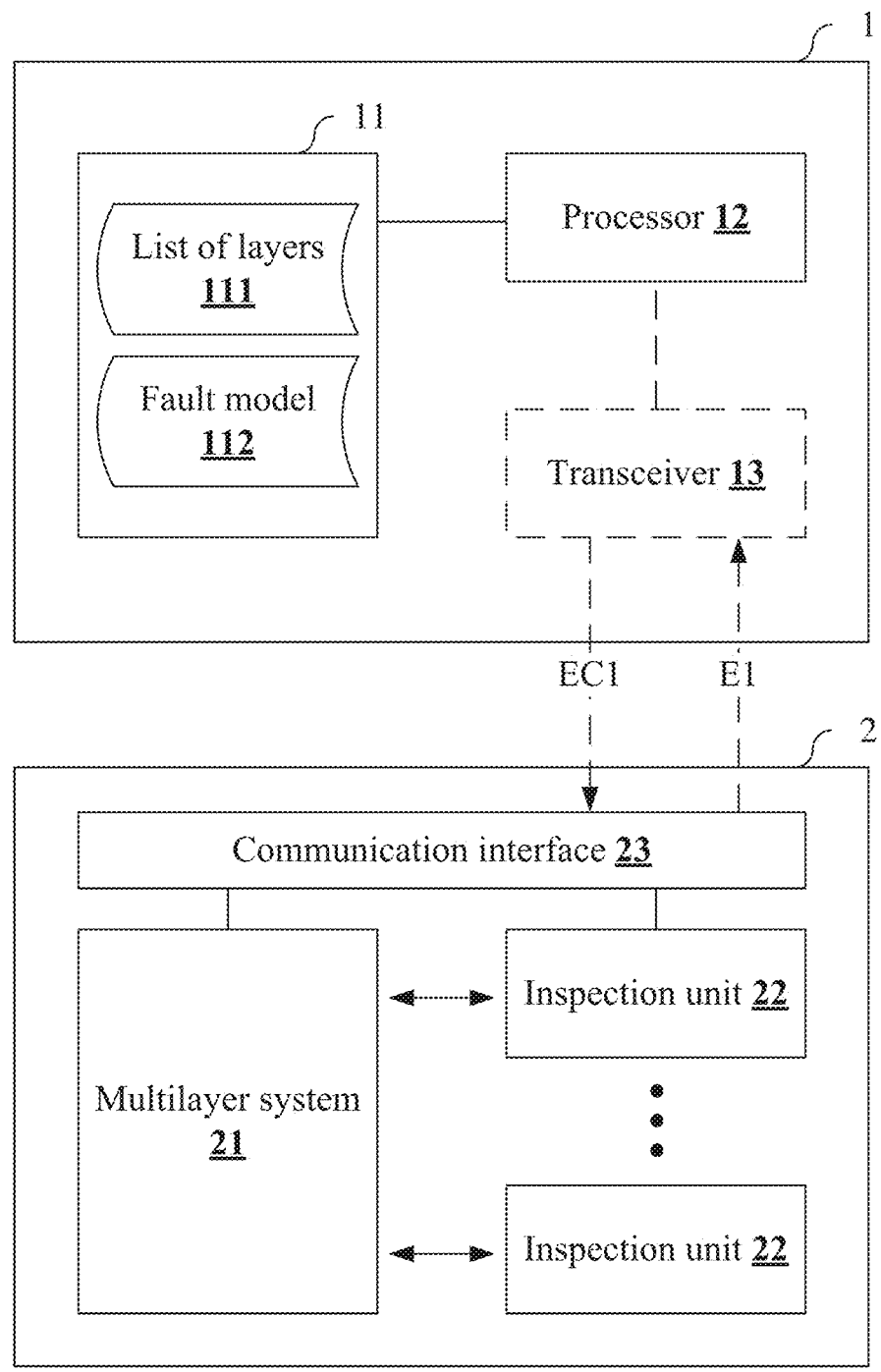
FIG. 1 depicts a fault-eliminating device and a corresponding target device according to one or more embodiments of the present disclosure.

FIG. 1 depicts a fault-eliminating device and a corresponding target device according to one or more embodiments of the present disclosure. The content shown in FIG. 1 is only for illustrating the embodiment of the present disclosure, instead of limiting the present disclosure.

Referring to FIG. 1, a fault-eliminating device 1 may basically comprise a storage 11 and a processor 12, and the storage 11 may be electrically connected with the processor 12. The electrical connection between the storage 11 and the processor 12 may be direct (i.e., connected not through other elements) or indirect (i.e., connected through other elements). The fault-eliminating device 1 may be one of various types of computing devices, such as, but not limited to, desktop computers, notebook computers, mobile phones, portable electronic accessories (watches, glasses, etc.). The fault-eliminating device 1 may be used to detect and eliminate faults occurring in a multilayer system 21 that may represent a target device 2.

The multilayer system 21 may comprise a plurality of layers, and the layers may correspond to a plurality of inspection units 22. The multilayer system 21 may be an abstracted layer set of the target device 2 (including hardware and an operating system (e.g., Windows, Linux, macOS, etc.) operating therein or a cloud operating system (e.g., OpenStack cloud platform, etc.)). In other words, each of the layers in the multilayer system 21 may represent a part of hardware and/or a part of software of the target device 2 corresponding to the layer. The inspection unit 22 may be used to detect fault events occurring in each layer, and it may be, for example but not limitation, an intelligent platform management interface (IPMI) unit or a program for analyzing various events occurring in a layer.

The storage 11 may be configured to store various data generated by the fault-eliminating device 1, data imported from external devices, or data input by users themselves. The storage 11 may comprise a first-level memory (also referred to as main memory or internal memory), and the processor 12 may directly read instruction sets stored in the first-level memory, and execute these instruction sets if needed. The storage 11 may optionally comprise a second-level memory (also referred to as external memory or secondary memory), and the memory at this level may use a data buffer to transmit stored data to the first-level memory. For example, the secondary memory may for example be a hard disk, an optical disk or the like, without being limited thereto. The storage 11 may optionally comprise a third-level memory, i.e., a storage device that can be inserted into or pulled out from a computer directly (e.g., a mobile disk). The storage 11 may be configured to store a list of layers 111 and a fault model 112.

Figure 2:
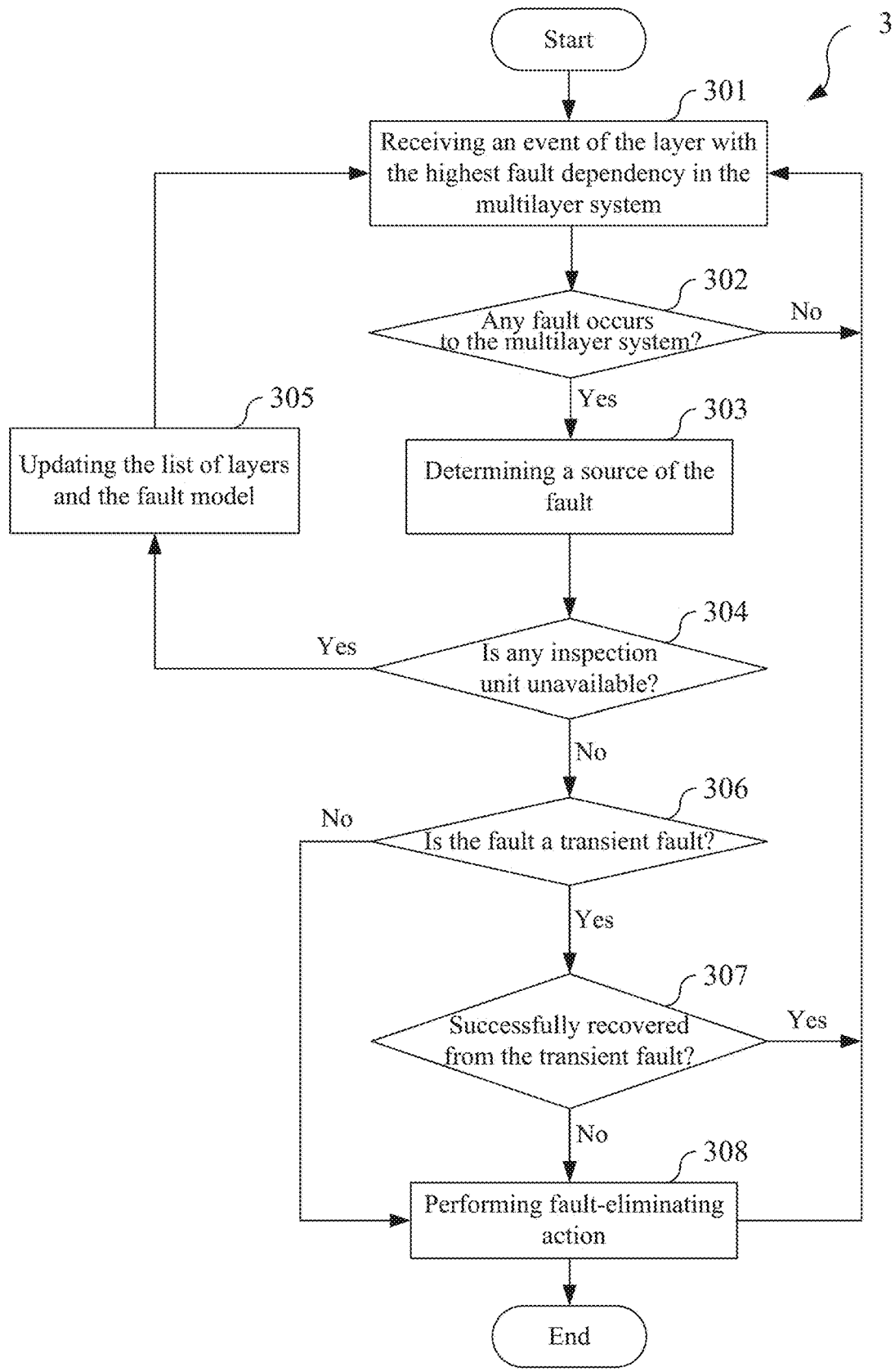
FIG. 2 depicts the fault detection and fault elimination according to one or more embodiments of the present disclosure.
Figure 3A:
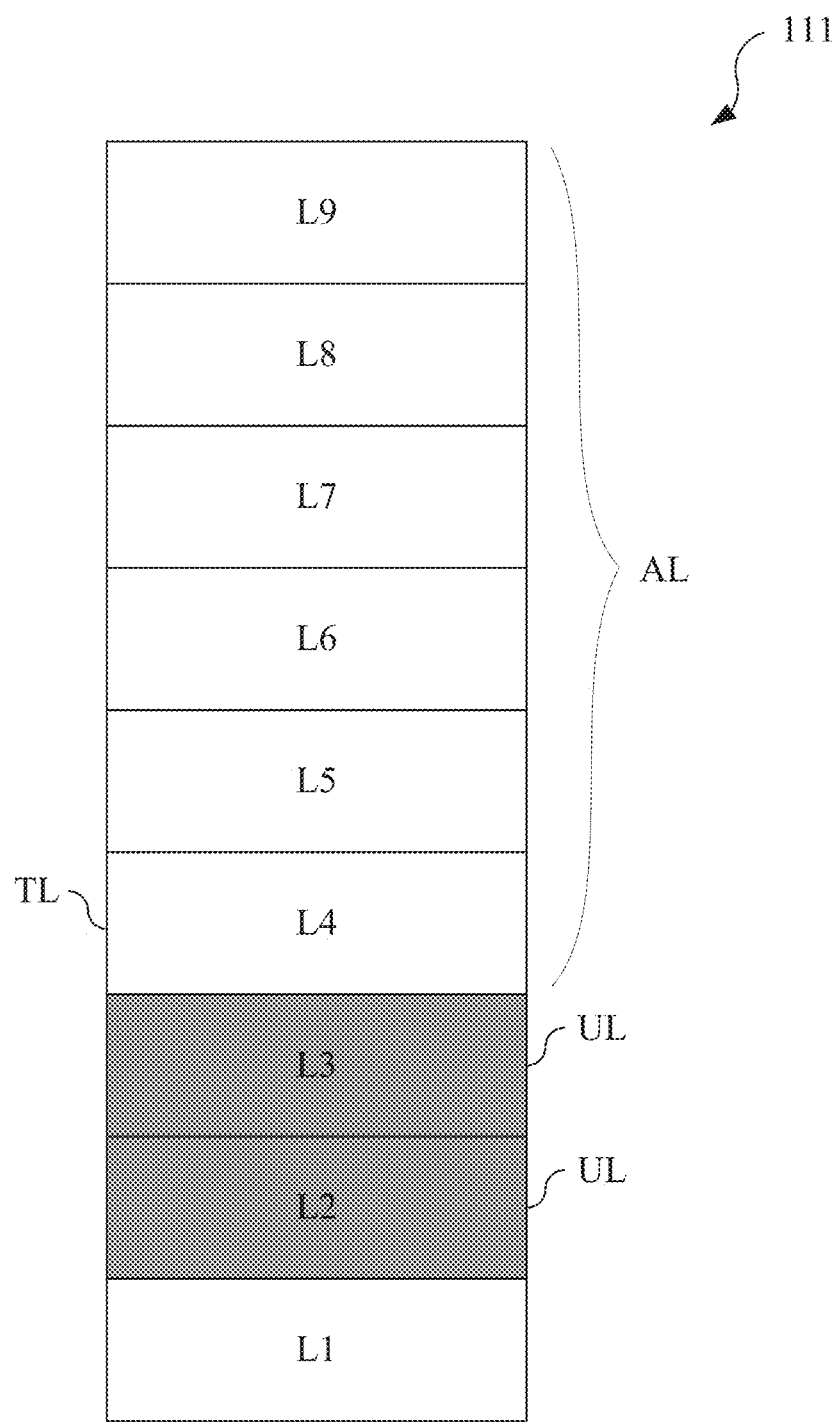
FIG. 3A depicts a list of layers before updating according to one or more embodiments of the present disclosure.
Figure 3B:
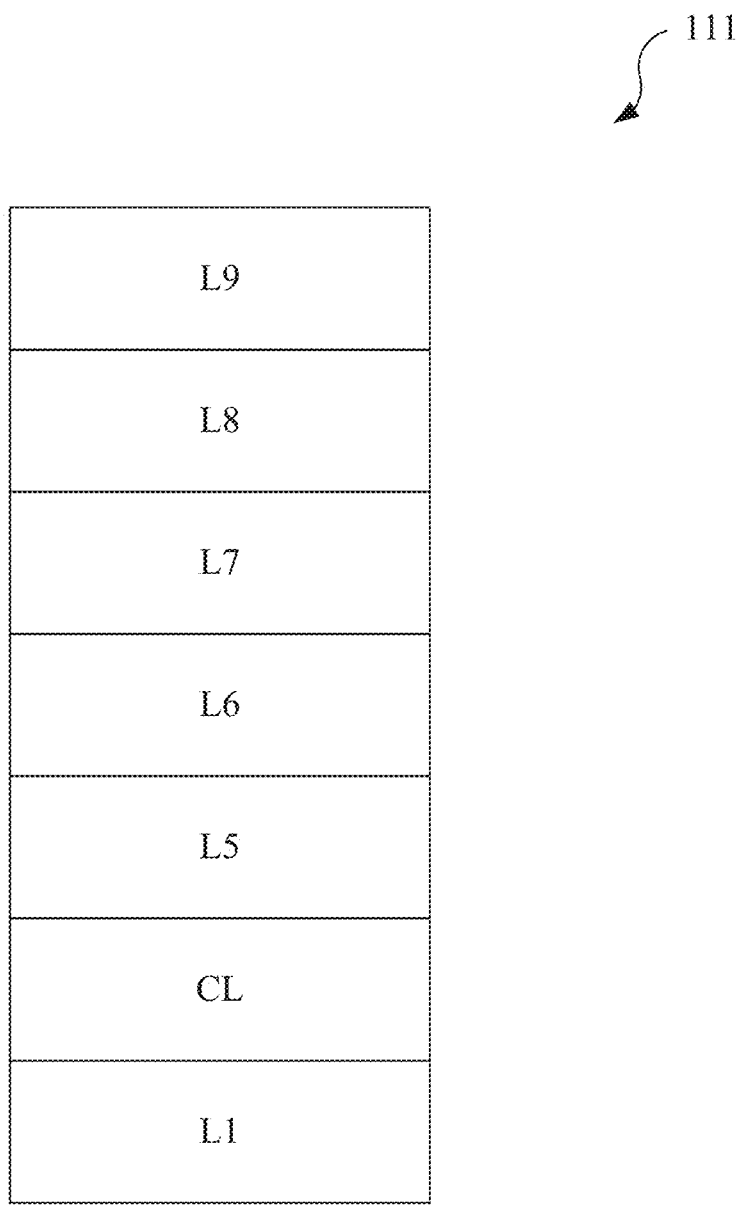
FIG. 3B depicts a list of layers that has been updated according to one or more embodiments of the present disclosure.

The list of layers 111 is data for presenting the layers in the multilayer system 21, and the implementation thereof may be shown in FIG. 3A and FIG. 3B, for example. The fault model 112 is data for defining fault symptoms of the layers when the fault in the multilayer system 21 occurs in each of the layers. Specific details of the list of layers 111 and the fault model 112 will be further explained in the following description of FIG. 2, FIG. 3A and FIG. 3B.

The processor 12 may be any of various microprocessors or microcontrollers capable of signal processing. A microprocessor or a microcontroller is a programmable specific integrated circuit that has the function of operation, storage, output/input or the like. Moreover, the microprocessor or the microcontroller can receive and process various coded instructions, thereby performing various logical operations and arithmetical operations and outputting corresponding operation results. The processor 12 may be programmed to interpret various instructions to process data in the fault-eliminating device 1 and execute various operations or programs.

In some embodiments, the fault-eliminating device 1 may further comprise a transceiver 13, and the transceiver 13 may be electrically connected with the processor 12. The transceiver 13 may be used for wired or wireless communication with the target device 2 (e.g., communication with a communication interface 23 in the target device 2, and it may be, for example but not limitation, an IPMI port or a network interface for sending and receiving network signals, etc.), so as to receive messages and/or events related to each layer in the multilayer system 21. In some embodiments, the transceiver 13 may also be used to send a control command for the multilayer system 21 to the communication interface 23. For example, the control command for the multilayer system 21 may be a fault-eliminating command EC1, which is related to at least one fault-eliminating action taken for the fault detected by the fault-eliminating device 1. In some embodiments, the transceiver 13 may comprise a transmitter and a receiver. Taking wireless communication as an example, the transceiver 13 may comprise, but is not limited to, an antenna, an amplifier, a modulator, a demodulator, a detector, an analog-to-digital converter, a digital-to-analog converter or other communication elements. Taking wired communication as an example, the transceiver 13 may be, for example but not limitation, a gigabit Ethernet transceiver, a gigabit Ethernet interface converter (GBIC), a small form-factor pluggable (SFP) transceiver, a ten gigabit small form-factor pluggable (XFP) transceiver, or the like.

FIG. 2 depicts the fault detection and fault elimination according to one or more embodiments of the present disclosure. FIG. 3A depicts a list of layers before updating according to one or more embodiments of the present disclosure. FIG. 3B depicts a list of layers that has been updated according to one or more embodiments of the present disclosure. The contents shown in FIG. 2, FIG. 3A and FIG. 3B are only for illustrating the embodiments of the present disclosure, instead of limiting the present disclosure.

Referring to FIG. 1, FIG. 2, FIG. 3A and FIG. 3B together, in some embodiments, the multilayer system 21 may comprise a plurality of layers L1, L2, . . . , L9, and these layers may be recorded in a list of layers 111. For example, the layers L1, L2, . . . , L9 may respectively represent a host hardware layer, a host operating system layer, a host network layer, a server layer, a virtual machine hardware layer, a virtual machine operating system layer, a virtual machine network layer, a Docker layer and a Containers layer of the target device 2 in sequence.

The layers L1, L2, . . . , L9 may each have a fault dependency, and the fault dependencies of these layers may have an ascending order; that is, the fault dependency of the layer L9 is the highest among these layers, while the fault dependency of the layer L1 is the lowest among these layers.

The fault symptom appearing in each layer may originate from the fault occurring in the layer itself, or from the fault occurring in a layer of which the fault dependency is lower than that of the layer.

In some embodiments, the processor 12 may perform fault detection and fault elimination through a process 3 executed for the multilayer system 21. The process 3 may start with an action 301, in which the processor 12 may receive an event E1 of the layer with the highest fault dependency in the multilayer system 21 from the communication interface 23 through the transceiver 13, because once any layer not with the highest fault dependency fails, it will cause the layer with the highest fault dependency (i.e., the layer L9) to fail. Then, in an action 302, the processor 12 may analyze the event E1 to determine whether any fault occurs to the multilayer system 21. If the processor 12 determines after analyzing the event E1 that a fault indeed has occurred to the multilayer system 21, then the processor 12 may further determine a source of the fault according to the list of layers 111 and the fault model 112 in an action 303. If the processor 12 determines that no fault has occurred to the multilayer system 21 in the action 302, then the processor 12 may return to perform the action 301 again to continue receiving other events in the layer with the highest fault dependency.

As mentioned above, the fault model 112 is configured to define the fault symptoms of the layers when the fault in the multilayer system 21 occurs in each of the layers. Accordingly, by referring to the list of layers 111 and the fault model 112, the processor 12 may determine which of the layers is the source of the fault of the multilayer system 21 based on the fault distribution of the multilayer system 21 received from each inspection unit 22. The fault distribution refers to the distribution regarding whether fault symptoms appear in the layers of the multilayer system 21. In some embodiments, an implementation of the fault model 112 may be as shown in Table 1 below:

TABLE 1

| Layer where the fault occurs | Fault distribution [L1,L2,L3,L4,L5,L6,L7,L8,L9] |
|---|---|
| Layer L9 | [0,0,0,0,0,0,0,0,1] |
| Layer L8 | [0,0,0,0,0,0,0,1,1] |
| Layer L7 | [0,0,0,0,0,0,1,1,1] |
| Layer L6 | [0,0,0,0,0,1,1,1,1] |
| Layer L5 | [0,0,0,0,1,1,1,1,1] |
| Layer L4 | [0,0,0,1,1,1,1,1,1] |
| Layer L3 | [0,0,1,1,1,1,1,1,1] |
| Layer L2 | [0,1,1,1,1,1,1,1,1] |
| Layer L1 | [1,1,1,1,1,1,1,1,1] |

In table 1, an array, in which the number of elements may correspond to the number of these layers, may be put into the field of fault distribution, and those elements in the array may sequentially represent the existence of a fault symptom in each of the layers reported by each inspection unit 22 corresponding to the layers L1 to L9 from left to right. If the value of the element is "0", then it means that no fault symptom exists in the corresponding layer, and if the value is "1", then it means that at least one fault symptom exists in the corresponding layer.

Specifically, in some embodiments, the method by which the processor 12 determines the source of the fault according to the list of layers 111 and the fault model 112 may be the aforesaid fault detection method for a multilayer system well known in the art, such as, but not limited to, an algorithm based on a binary-search-tree data structure for detecting fault of multilayer system that is described in Taiwan Invention Patent No. I691852 (entitled "Error detecting device and error detecting method for detecting failure of hierarchical system, computer readable recording medium, and computer program product").

Since the above-mentioned fault-detecting method for multilayer system needs to refer to the fault symptom of each of the layers to find out the source of the fault, the detection cannot be thoroughly performed if the inspection units 22 corresponding to these layers in the multilayer system 21 are unavailable. In view of this, when determining the source of the fault, the processor 12 may simultaneously determine whether the inspection unit 22 corresponding to each of the layers is unavailable in an action 304. Situations in which the inspection unit 22 may be unavailable may include for example, but not limitation, a fault occurring to the inspection unit 22, or an incorrect correspondence existing between the layer and the inspection unit 22 (i.e., the inspection unit 22 cannot be used to detect the fault symptom of the layer).

In some embodiments, the method of determining whether the inspection unit 22 is unavailable may be to analyze the message received from the inspection unit 22 (e.g., the event related to each layer reported by the inspection unit 22) and then determine whether the message is unexpected by the processor 12. If the result of determination is "Yes", it is further determined that the inspection unit 22 is unavailable.

If the processor 12 determined, in the action 304, that the inspection unit 22 corresponding to at least one layer is unavailable, then in action 305, the processor 12 may update the list of layers 111 and the fault model 112 by reconstruction. Specifically, as shown in FIG. 3A and FIG. 3B, if the processor 12 determined that the inspection units 22 corresponding to the layers L2 and L3 are unavailable (the layer where the corresponding inspection unit 22 is unavailable is hereinafter referred to as a disabled layer UL), then the processor 12 may identify the layers L4, L5, L6, L7, L8 and L9 where the fault dependencies are higher than those of the layers L2 and L3 and the corresponding inspection units 22 are active (the layer where the corresponding inspection unit 22 is active and the fault dependency is higher than the disabled layer UL is hereinafter referred to as an available layer AL), select the layer L4 with the lowest fault dependency from the layers L4 to L9 (the one with the lowest fault dependency among the at least one available layer AL is hereinafter referred to as a target layer TL), then define the layers L2, L3 and L4 as a combined layer CL in the list of layers 111, and replace the layers L2, L3 and L4 with the combined layer CL, thereby updating the list of layers 111.

Since the combined layer CL corresponds to the layers L2, L3 and L4 in the list of layers 111 before updating, the processor 12 may make the inspection unit 22 corresponding to the layer L4 correspond to the combined layer CL. In other words, since the inspection unit 22 corresponding to the layer L4 is active, and no matter which one among the layers L2, L3 or L4 fails, the inspection unit 22 corresponding to the layer L4 will report the fault symptom of the layer L4 to the processor 12, the inspection unit 22 corresponding to the layer L4 may be used as the inspection unit 22 corresponding to the combined layer CL.

Next, because the layer structure in the multilayer system 21 has been changed, the processor 12 may correspondingly make the fault symptoms originally corresponding to the layer L2, the layer L3 and the layer L4 correspond to the combined layer CL in the fault model 112, thereby updating the fault model 112. Specifically, in view of the fault dependency of each layer, if the source of the fault is any one of the layer L2, the layer L3 and the layer L4, then the layer L5, the layer L6, the layer L7, the layer L8 and the layer L9 with higher fault dependencies than the layer L2, the layer L3 and the layer L4 will also have corresponding fault symptoms, and thus the processor 12 may determine the fault symptoms corresponding to the combined layer CL in the fault model 112 according to this phenomenon. An implementation of the updated fault model 112 may be as shown in Table 2 below:

TABLE 2

| Layer where the fault occurs | Fault distribution [L1,CL,L5,L6,L7,L8,L9] |
|---|---|
| Layer L9 | [0,0,0,0,0,0,1] |
| Layer L8 | [0,0,0,0,0,1,1] |
| Layer L7 | [0,0,0,0,1,1,1] |
| Layer L6 | [0,0,0,1,1,1,1] |
| Layer L5 | [0,0,1,1,1,1,1] |
| Combined layer CL | [0,1,1,1,1,1,1] |
| Layer L1 | [1,1,1,1,1,1,1] |

In some embodiments, the actions 304 and 305 may be performed independently of other actions before the start of the process 3. Specifically, the processor 12 may send at least one preset message to each inspection unit 22 through the transceiver 13 to determine whether each inspection unit 22 returns an unexpected message or whether each inspection unit 22 does not return a message within a preset time interval. If the above result of the determination for any inspection unit 22 is "Yes", then the processor 12 may further determine that the inspection unit 22 is unavailable.

In some embodiments, in addition to updating the list of layers 111 and the fault model 112, the processor 12 may also update a transient-fault information set accordingly. The transient-fault information set is a data set for presenting information about whether the fault of each layer in the multilayer system 21 is a transient fault or not. The transient fault refers to a fault of which the duration is shorter than the tolerable time of the target device 2 for the fault, such as but not limited to, transient network busyness. When the transient fault disappears, the generated fault symptom will also disappear and the target device 2 may continue to operate normally. On the contrary, a permanent fault, which is not a transient fault, refers to a fault of which the duration exceeds the tolerable time of the target device 2 for the fault, and the permanent fault will cause the target device 2 to have permanent fault symptoms, such as but not limited to, power termination.

In some embodiments, an implementation of the transient-fault information set before and after being updated by the processor 12 may be as shown in Table 3 and Table 4 below respectively:

TABLE 3

| Layer | Fault probability | Overall fault-detecting time (s) | Preliminary fault-detecting time (s) | Possibility of transient fault | Transient-fault-eliminating time (s) |
|---|---|---|---|---|---|
| Layer L9 | 0.1123 | 1 | 1 | No | |
| Layer L8 | 0.1123 | 3 | 3 | No | |
| Layer L7 | 0.1123 | 2 | 1 | Yes | 1 |
| Layer L6 | 0.1123 | 2 | 1 | Yes | 1 |
| Layer L5 | 0.1123 | 1 | 1 | No | |
| Layer L4 | 0.1123 | 4 | 3 | Yes | 1 |
| Layer L3 | 0.1122 | 30 | 1 | Yes | 29 |

TABLE 3-continued

| Layer | Fault probability | Overall fault-detecting time (s) | Preliminary fault-detecting time (s) | Possibility of transient fault | Transient-fault-eliminating time (s) |
|---|---|---|---|---|---|
| Layer L2 | 0.0284 | 4 | 2 | Yes | 2 |
| Layer L1 | 0.1856 | 1 | 1 | No | |

TABLE 4

| Layer | Fault probability | Overall fault-detecting time (s) | Preliminary fault-detecting time (s) | Possibility of transient fault | Transient-fault-eliminating time (s) |
|---|---|---|---|---|---|
| Layer L9 | 0.1123 | 1 | 1 | No | |
| Layer L8 | 0.1123 | 3 | 3 | No | |
| Layer L7 | 0.1123 | 2 | 1 | Yes | 1 |
| Layer L6 | 0.1123 | 2 | 1 | Yes | 1 |
| Layer L5 | 0.1123 | 1 | 1 | No | |
| Combined Layer CL | 0.2529 | 30 | 3 | Yes | 27 |
| Layer L1 | 0.1856 | 1 | 1 | No | |

Specifically, in some embodiments, the transient-fault information set may comprise fault probability, overall fault-detecting time, preliminary fault-detecting time, transient-fault-eliminating time and/or the possibility of transient fault corresponding to each layer. The overall fault-detecting time for a layer represents the time of which the multilayer system 21 may tolerate faults occurring in this layer. If a transient fault may occur in one layer, then the overall fault-detecting time may be further divided into the preliminary fault-detecting time and the transient-fault-eliminating time (in other words, the overall fault-detecting time is the sum of the preliminary fault-detecting time and the transient-fault-eliminating time), and the inspection unit 22 will only detect during the preliminary fault-detecting time. If it is determined that the layer is the layer where the fault occurs, then the transient-fault-eliminating time may be used to determine whether the fault is a transient fault, and it is determined specifically by continuously detecting whether the layer has fault symptoms during the transient-fault-eliminating time. If it is detected that there is no fault symptom in the layer within the transient-fault-eliminating time, then it means that the fault has been automatically eliminated (that is, the multilayer system 21 has successfully recovered from the fault), and otherwise it means that the fault is a permanent fault. For example, given that it is possible for the layer L3 (i.e., the host network of the target device 2) to have transient faults such as busy network, it is assumed that the tolerable time of the multilayer system 21 for the transient fault of busy network is thirty seconds, and the time may be further divided into a preliminary fault-detecting time of one second and a transient-fault-eliminating time of twenty-nine seconds.

In some embodiments, when updating the transient-fault information set, the processor 12 may determine the corresponding data content for the combined layer CL according to the updated list of layers 111. For example, first of all, since at least one of the layers L2, L3 and L4 is likely to have a transient fault, the combined layer CL is also likely to have a transient fault. Then, the fault probability corresponding to the combined layer CL may be the sum of a plurality of fault probabilities corresponding to the layer L2, the layer L3 (i.e., the disabled layers) and the layer L4 (i.e., the target layer TL), and the overall fault-detecting time corresponding to the combined layer CL may be the maximum of a plurality of overall fault-detecting times corresponding to the layers L2, L3 and L4. In addition, the preliminary fault-detecting time corresponding to the combined layer CL may be the maximum of a plurality of preliminary fault-detecting times corresponding to the layers L2, L3 and L4. After determining the overall fault-detecting time and the preliminary fault-detecting time of the combined layer CL, the processor 12 may calculate the transient-fault-eliminating time corresponding to the combined layer CL according to the overall fault-detecting time and the preliminary fault-detecting time. Upon completion of the above calculation, the processor 12 may replace a plurality of transient-fault information corresponding to the layers L2, L3 and L4 with the transient-fault information of the combined layer CL, thereby updating the transient-fault information set.

Referring back to FIG. 2, after updating the list of layers 111 and the fault model 112, the processor 12 may perform the action 301 again. At this time, if the fault of the layer L9 is not automatically eliminated, then the processor 12 will still receive the same event E1, so the processor 12 will still determine that a fault has occurred in the multilayer system 21 in the action 302, and thus performs the action 303 again. Since the list of layers 111 has been updated, the inspection units 22 corresponding to the layer L1, the combined layer CL, the layer L5, the layer L6, the layer L7, the layer L8 and the layer L9 are all active. Therefore, the processor 12 may determine the source of the fault in the multilayer system 21 in a way as described above.

In some embodiments, after determining the source of the fault, the processor 12 may perform a corresponding strategy of fault elimination for the source of the fault. The strategy of fault elimination comprises determining whether the fault may be a transient fault, and performing corresponding fault-eliminating actions according to the determined result. In detail, the processor 12 may determine whether the fault may be a transient fault according to the updated transient-fault information set in an action 306. If it is determined that the fault may be a transient fault, then it means that it may possibly be automatically eliminated, and the processor 12 may further determine whether the fault is automatically eliminated within the corresponding transient-fault-eliminating time in an action 307. If the result of determination is "Yes", then it means that the fault elimination of the multilayer system 21 has been completed, so the processor 12 may perform the action 301 again to start the next round of fault detection and fault elimination.

If it is determined in the action 306 that the fault is unlikely to be a transient fault, or if the fault is not automatically eliminated within the transient-fault-eliminating time although the fault may be a transient fault, then the processor 12 may perform a fault-eliminating action corresponding to the source for the multilayer system 21 in an action 308 to eliminate the fault.

For example, before updating the list of layers 111, the fault-eliminating actions corresponding to each of the layers may be as shown in Table 5 below. It shall be noted that, the fault-eliminating actions shown in Table 5 are only examples and are not limitations. In other words, in addition to the fault-eliminating actions shown in Table 5, various other fault-eliminating actions known and feasible in the art may also be taken for faults occurring in the layers.

TABLE 5

| Layer | Fault-eliminating actions |
| --- | --- |
| Layer L9 | Restart Container on the original host |
| Layer L8 | Restart Docker on the original host |
| Layer L7 | Restart the virtual machine on the original host |
| Layer L6 | Restart the virtual machine on the original host |
| Layer L5 | Restart the virtual machine on the original host |
| Layer L4 | Restart the server on the original host |
| Layer L3 | Restart the virtual machine on other healthy (i.e., normally-working) hosts and restart the host |
| Layer L2 | Restart the virtual machine on other healthy hosts and restart the host |
| Layer L1 | Restart the virtual machine on other healthy hosts and shut down the host |

In some embodiments, after updating the list of layers 111, the processor 12 may define the fault-eliminating action of the combined layer CL based on the fault-eliminating actions of the layers L2, L3 and L4, which specifically consists of the fault-eliminating actions corresponding to the layers L2, L3 (i.e., the at least one disabled layer UL) and the layer L4 (i.e., the target layer TL) in an ascending order of the fault dependencies of the layers. That is, the fault-eliminating action corresponding to the combined layer CL may be to perform the fault-eliminating action corresponding to the layer L2, the layer L3 and the layer L4 sequentially.

In some embodiments, after the fault is eliminated, the processor 12 may similarly perform the action 301 again to start the next round of fault detection and fault elimination.

In some embodiments, the processor 12 may perform the above-mentioned fault detection and fault elimination process 3 for all layers in a subset of the layers in the multilayer system 21. For example, in the multilayer system 21, the layers L1, L2, L3 and L4 respectively corresponding to the host hardware, the host operating system, the host network and the server may form a subset related to hardware infrastructure, while the layers L5, L6, L7 and L8 respectively corresponding to the virtual machine hardware, the virtual machine operating system, the virtual machine network and the Dockers may form another subset related to the virtual machine. Since there may be more than one virtual machine running in the multilayer system 21, when the inspection unit 22 reports that a certain layer (e.g., the layer L7) related to the virtual machine has a fault symptom, actually it may just be that one of the virtual machines has an error message. In this case, if the processor 12 finds out, by performing the above-mentioned process 3 for all layers, that the fault-eliminating action corresponding to the source of the fault is "Restart the server", executing this fault-eliminating action will cause other virtual machines that were originally operating normally to be forcibly shut down and restarted together, thereby causing unnecessary resource waste and service interruption. Therefore, the processor 12 may instead perform the same fault detection and fault elimination process 3 as above for these subsets respectively to avoid the above disadvantages.

Figure 4:
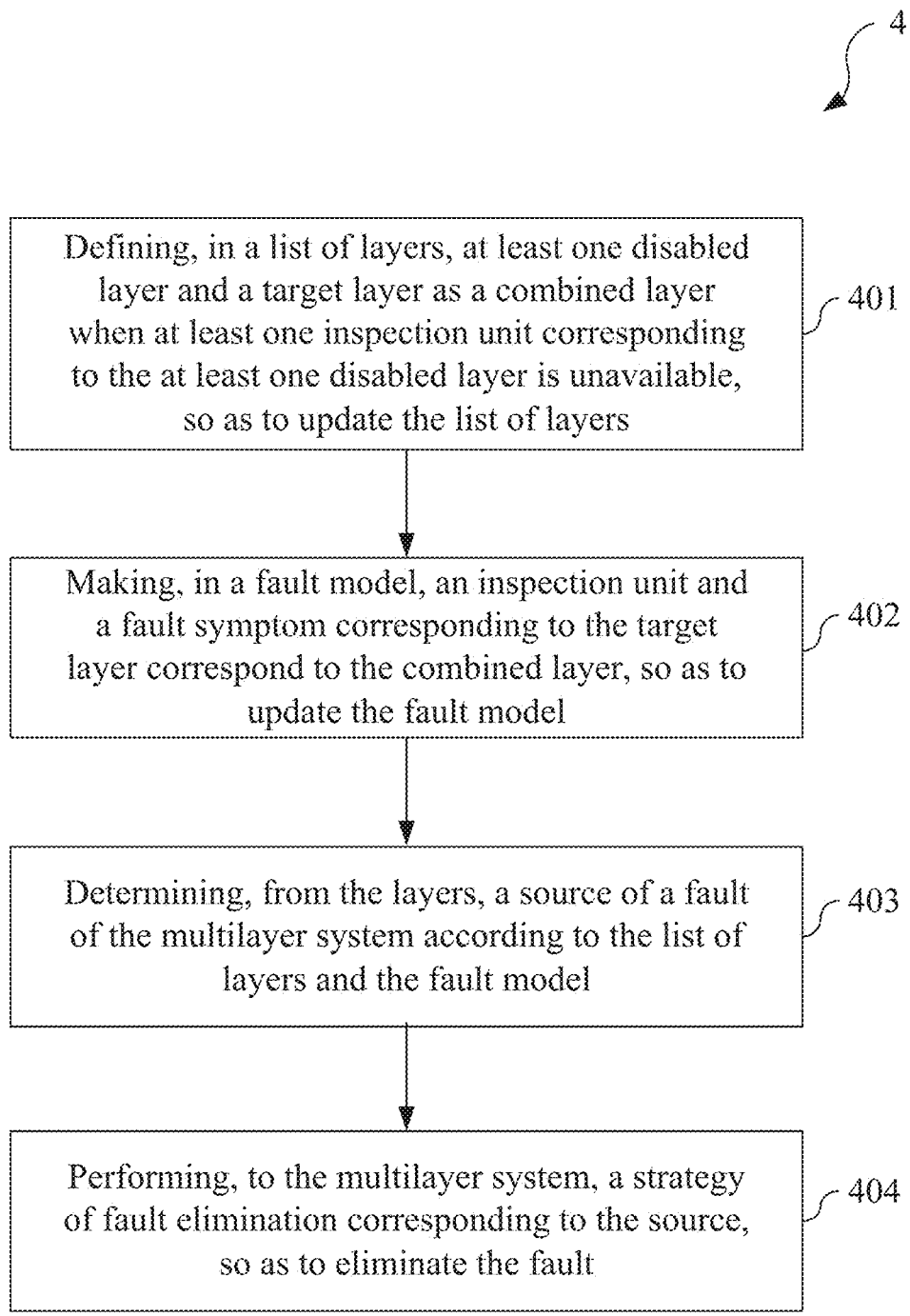
FIG. 4 depicts a fault-eliminating method according to one or more embodiments of the present disclosure.

FIG. 4 depicts a fault-eliminating method according to one or more embodiments of the present disclosure. The content shown in FIG. 4 is only for illustrating the embodiment of the present disclosure, instead of limiting the present disclosure.

Referring to FIG. 4, a fault-eliminating method 4 may be executed by an electronic computing device. The electronic computing device may store a list of layers and a fault model. The fault-eliminating method 4 may be applied to a multilayer system that comprises a plurality of layers, and each of the layers has a fault dependency. The fault-eliminating method 4 may comprise the following steps:

defining, in the list of layers, at least one disabled layer and a target layer as a combined layer when at least one inspection unit corresponding to the at least one disabled layer is unavailable, so as to update the list of layers (labeled as 401), wherein the fault dependency of the target layer is the lowest among the fault dependency of at least one available layer. At least one inspection unit of the at least one available layer is active, and the fault dependency of the at least one available layer is higher than the fault dependency of the at least one disabled layer;

making, in the fault model, the inspection unit and a fault symptom corresponding to the target layer correspond to the combined layer, so as to update the fault model (labeled as 402);

determining, from the layers, a source of a fault of the multilayer system according to the list of layers and the fault model (labeled as 403); and performing, to the multilayer system, a strategy of fault elimination corresponding to the source, so as to eliminate the fault (labeled as 404).

In some embodiments, the fault-eliminating method 4 may further comprise the following step: performing an algorithm that is based on a binary-search-tree structure for detecting fault of multilayer system, so as to determine the source of the fault.

In some embodiments, the fault-eliminating method 4 may further comprise the following steps:

updating the list of layers by replacing the at least one disabled layer and the target layer with the combined layer; and updating the fault model by replacing a plurality of fault symptoms corresponding to the at least one disabled layer and the target layer with the fault symptom corresponding to the combined layer.

In some embodiments, the fault-eliminating method 4 may further comprise the following steps:

determining a transient-fault information corresponding to the combined layer according to the list of layers updated and a transient-fault information set, wherein the transient-fault information at least comprises a fault probability, an overall fault-detecting time and a preliminary fault-detecting time; and replacing a plurality of transient-fault information corresponding to the at least one disabled layer and the target layer in the transient-fault information set with the transient-fault information corresponding to the combined layer, so as to update the transient-fault information set. In the transient-fault information, the fault probability corresponding to the combined layer may be the sum of a plurality of fault probabilities corresponding to the at least one disabled layer and the target layer, the overall fault-detecting time corresponding to the combined layer may be the maximum of a plurality of overall fault-detecting times corresponding to the at least one disabled layer and the target layer, and the preliminary fault-detecting time corresponding to the combined layer may be the maximum of a plurality of preliminary fault-detecting times corresponding to the at least one disabled layer and the target layer. Additionally, in some embodiments, the fault-eliminating method 4 may further comprise the following step: determining a transient-fault-eliminating time corresponding to the combined layer according to the overall fault-detecting time and the preliminary fault-detecting time if it is possible for a transient fault to exist in the combined layer. At this point, the transient-fault information may further comprise the transient-fault-eliminating time. Moreover, when the source of the fault is the combined layer, the strategy of fault elimination may comprise: waiting for the fault to become eliminated automatically within the transient-fault-eliminating time corresponding to the combined layer if it is possible for a transient fault to exist in the combined layer; and performing a fault-eliminating action corresponding to the combined layer if it is impossible for the transient fault to exist in the combined layer, or if it is possible for the transient fault to exist in the combined layer but the fault is not eliminated automatically within the transient-fault-eliminating time. In some embodiments, the fault-eliminating method 4 may further comprise the following step: defining the fault-eliminating action corresponding to the combined layer. The fault-eliminating action corresponding to the combined layer may consist of a plurality of fault-eliminating actions corresponding to the at least one disabled layer and the target layer in an ascending order of the fault dependencies of the at least one disabled layer and the target layer.

Each embodiment of the fault-eliminating method 4 basically corresponds to a certain embodiment of the fault-eliminating device 1. Therefore, those of ordinary skill in the art may fully understand and implement all the corresponding embodiments of the fault-eliminating method 4 simply by referring to the above description of the fault-eliminating device 1, even though each embodiment of the fault-eliminating method 4 is not described in detail above.

In some embodiments, the fault-eliminating method 4 may be implemented as a computer program product. When the computer program product is loaded into the electronic computing device, a plurality of program instructions contained in the computer program product may execute the fault-eliminating method 4 described in the second embodiment. The computer program product may be stored in a non-transitory tangible machine-readable medium, for example but not limitation, a read-only memory (ROM), a flash memory, a floppy disk, a mobile hard disk, a magnetic tape, a database accessible to networks, or any other storage medium with the same function and well known to those of ordinary skill in the art.

The above disclosure is related to the detailed technical contents and inventive features thereof. People of ordinary skill in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A fault-eliminating device for a multilayer system that comprises a plurality of layers, each of the layers having a fault dependency, the fault-eliminating device comprising:
    a storage configured to store a list of layers and a fault model; and
    a processor electrically connected with the storage, the processor being configured to:
        determine, from the layers, a source of a fault corresponding to the multilayer system according to the list of layers and the fault model; and
        perform, to the multilayer system, a strategy of fault elimination corresponding to the source, so as to eliminate the fault;
    wherein when at least one inspection unit that corresponds to at least one disabled layer of the layers is unavailable, the processor is further configured to:
        define, in the list of layers, at least one disabled layer and a target layer as a combined layer, so as to update the list of layers, wherein the fault dependency of the target layer is a lowest among the fault dependency of at least one available layer, and at least one inspection unit corresponding to the at least one available layer is active, and the fault dependency of the at least one available layer is higher than the fault dependency of the at least one disabled layer; and
        make, in the fault model, the inspection unit and a fault symptom corresponding to the target layer correspond to the combined layer, so as to update the fault model.

2. The fault-eliminating device of claim 1, wherein the processor is further configured to perform an algorithm that is based on a binary-search-tree structure for detecting fault of multilayer system, so as to determine the source of the fault.

3. The fault-eliminating device of claim 1, wherein the processor updates the list of layers by replacing the at least one disabled layer and the target layer with the combined layer, and the processor updates the fault model by replacing a plurality of fault symptoms corresponding to the at least one disabled layer and the target layer with the fault symptom corresponding to the combined layer.

4. The fault-eliminating device of claim 1, wherein the processor is further configured to:
    determine a transient-fault information corresponding to the combined layer according to the list of layers which has been updated and a transient-fault information set, wherein the transient-fault information at least comprises a fault probability, an overall fault-detecting time and a preliminary fault-detecting time; and
    replace a plurality of transient-fault information corresponding to the at least one disabled layer and the target layer in the transient-fault information set with the transient-fault information corresponding to the combined layer, so as to update the transient-fault information set;
    wherein the fault probability corresponding to the combined layer is a sum of a plurality of fault probabilities corresponding to the at least one disabled layer and the target layer;
    wherein the overall fault-detecting time corresponding to the combined layer is a maximum of a plurality of overall fault-detecting times corresponding to the at least one disabled layer and the target layer; and
    wherein the preliminary fault-detecting time corresponding to the combined layer is a maximum of a plurality of preliminary fault-detecting times corresponding to the at least one disabled layer and the target layer.

5. The fault-eliminating device of claim 4, wherein the processor is further configured to:
    determine a transient-fault-eliminating time corresponding to the combined layer according to the overall fault-detecting time and the preliminary fault-detecting time, when it is possible for a transient fault to exist in the combined layer;
    wherein the transient-fault information further comprises the transient-fault-eliminating time.

6. The fault-eliminating device of claim 5, wherein when the source of the fault is the combined layer, the strategy of fault elimination comprises:
    waiting for the fault to become eliminated automatically within the transient-fault-eliminating time corresponding to the combined layer when it is possible for a transient fault to exist in the combined layer; and performing a fault-eliminating action corresponding to the combined layer when it is impossible for the transient fault to exist in the combined layer, or when it is possible for the transient fault to exist in the combined layer but the fault is not eliminated automatically within the transient-fault-eliminating time.

7. The fault-eliminating device of claim 6, wherein the processor is further configured to define the fault-eliminating action corresponding to the combined layer, wherein the fault-eliminating action corresponding to the combined layer consists of a plurality of fault-eliminating actions corresponding to the at least one disabled layer and the target layer in an ascending order of the fault dependencies of the at least one disabled layer and the target layer.

8. A non-transitory tangible machine-readable medium, the non-transitory tangible machine-readable medium storing a computer program product, an electronic computing device executing a fault-eliminating method after a plurality of program instructions comprised in the computer program product are loaded into the electronic computing device, the fault-eliminating method being applied to a multilayer system that comprises a plurality of layers, the electronic computing device storing a list of layers and a fault model, each of the layers having a fault dependency, the fault-eliminating method comprising the following steps:
defining, in the list of layers, at least one disabled layer and a target layer as a combined layer when at least one inspection unit corresponding to the at least one disabled layer is unavailable, so as to update the list of layers, wherein the fault dependency of the target layer is a lowest among the fault dependency of at least one available layer, and at least one inspection unit of the at least one available layer is active, and the fault dependency of the at least one available layer is higher than the fault dependency of the at least one disabled layer;
making, in the fault model, the inspection unit and a fault symptom corresponding to the target layer correspond to the combined layer, so as to update the fault model;
determining, from the layers, a source of a fault of the multilayer system according to the list of layers and the fault model; and
performing, to the multilayer system, a strategy of fault elimination corresponding to the source, so as to eliminate the fault.

9. The non-transitory tangible machine-readable medium of claim 8, wherein the fault-eliminating method further comprises the following step:
performing an algorithm that is based on a binary-search-tree structure for detecting fault of multilayer system, so as to determine the source of the fault.

10. The non-transitory tangible machine-readable medium of claim 8, wherein the fault-eliminating method further comprises the following steps:
updating the list of layers by replacing the at least one disabled layer and the target layer with the combined layer; and
updating the fault model by replacing a plurality of fault symptoms corresponding to the at least one disabled layer and the target layer with the fault symptom corresponding to the combined layer.

11. The non-transitory tangible machine-readable medium of claim 8, wherein the fault-eliminating method further comprises the following steps:
determining a transient-fault information corresponding to the combined layer according to the list of layers which has been updated and a transient-fault information set, wherein the transient-fault information at least comprises a fault probability, an overall fault-detecting time and a preliminary fault-detecting time; and
replacing a plurality of transient-fault information corresponding to the at least one disabled layer and the target layer in the transient-fault information set with the transient-fault information corresponding to the combined layer, so as to update the transient-fault information set;
wherein the fault probability corresponding to the combined layer is a sum of a plurality of fault probabilities corresponding to the at least one disabled layer and the target layer;
wherein the overall fault-detecting time corresponding to the combined layer is a maximum of a plurality of overall fault-detecting times corresponding to the at least one disabled layer and the target layer; and
wherein the preliminary fault-detecting time corresponding to the combined layer is a maximum of a plurality of preliminary fault-detecting times corresponding to the at least one disabled layer and the target layer.

12. The non-transitory tangible machine-readable medium of claim 11, wherein the fault-eliminating method further comprises the following steps:
determining a transient-fault-eliminating time corresponding to the combined layer according to the overall fault-detecting time and the preliminary fault-detecting time when it is possible for a transient fault to exist in the combined layer;
wherein the transient-fault information further comprises the transient-fault-eliminating time.

13. The non-transitory tangible machine-readable medium of claim 12, wherein when the source of the fault is the combined layer, the strategy of fault elimination comprises:
waiting for the fault to become eliminated automatically within the transient-fault-eliminating time corresponding to the combined layer when it is possible for a transient fault to exit in the combined layer; and
performing a fault-eliminating action corresponding to the combined layer when it is impossible for the transient fault to exit in the combined layer, or when it is possible for the transient fault to exit in the combined layer but the fault is not eliminated automatically within the transient-fault-eliminating time.

14. The non-transitory tangible machine-readable medium of claim 13, wherein the fault-eliminating method further comprises the following steps:
defining the fault-eliminating action corresponding to the combined layer, wherein the fault-eliminating action corresponding to the combined layer consists of a plurality of fault-eliminating actions corresponding to the at least one disabled layer and the target layer in an ascending order of the fault dependencies of the at least one disabled layer and the target layer.

15. A fault-eliminating method, being executed by an electronic computing device that stores a list of layers and a fault model and being applied to a multilayer system that comprises a plurality of layers, each of the layers having a fault dependency, the fault-eliminating method comprising the following steps:
defining, in the list of layers, at least one disabled layer and a target layer as a combined layer when at least one inspection unit corresponding to the at least one disabled layer is unavailable, so as to update the list of layers, wherein the fault dependency of the target layer is a lowest among the fault dependency of at least one available layer, and at least one inspection unit of the at least one available layer is active, and the fault dependency of the at least one available layer is higher than the fault dependency of the at least one disabled layer;

making, in the fault model, the inspection unit and a fault symptom corresponding to the target layer correspond to the combined layer, so as to update the fault model;

determining, from the layers, a source of a fault of the multilayer system according to the list of layers and the fault model; and performing, to the multilayer system, a strategy of fault elimination corresponding to the source, so as to eliminate the fault.

16. The fault-eliminating method of claim 15, further comprising the following step:

Performing an algorithm that is based on a binary-search-tree structure for detecting fault of multilayer system, so as to determine the source of the fault.

17. The fault-eliminating method of claim 15, further comprising the following steps:

updating the list of layers by replacing the at least one disabled layer and the target layer with the combined layer; and updating the fault model by replacing a plurality of fault symptoms corresponding to the at least one disabled layer and the target layer with the fault symptom corresponding to the combined layer.

18. The fault-eliminating method of claim 15, further comprising the following steps:

determining a transient-fault information corresponding to the combined layer according to the list of layers which has been updated and a transient-fault information set, wherein the transient-fault information at least comprises a fault probability, an overall fault-detecting time and a preliminary fault-detecting time; and replacing a plurality of transient-fault information corresponding to the at least one disabled layer and the target layer in the transient-fault information set with the transient-fault information corresponding to the combined layer, so as to update the transient-fault information set;

wherein:

the fault probability corresponding to the combined layer is a sum of a plurality of fault probabilities corresponding to the at least one disabled layer and the target layer;

the overall fault-detecting time corresponding to the combined layer is a maximum of a plurality of overall fault-detecting times corresponding to the at least one disabled layer and the target layer; and the preliminary fault-detecting time corresponding to the combined layer is a maximum of a plurality of preliminary fault-detecting times corresponding to the at least one disabled layer and the target layer.

19. The fault-eliminating method of claim 18, further comprising the following steps:

determining a transient-fault-eliminating time corresponding to the combined layer according to the overall fault-detecting time and the preliminary fault-detecting time when it is possible for a transient fault to exist in the combined layer;

wherein the transient-fault information further comprises the transient-fault-eliminating time.

20. The fault-eliminating method of claim 19, wherein when the source of the fault is the combined layer, the strategy of fault elimination comprises:

waiting for the fault to become eliminated automatically within the transient-fault-eliminating time corresponding to the combined layer when it is possible for a transient fault to exist in the combined layer; and performing a fault-eliminating action corresponding to the combined layer when it is impossible for the transient fault to exist in the combined layer, or when it is possible for the transient fault to exist in the combined layer but the fault is not eliminated automatically within the transient-fault-eliminating time.

21. The fault-eliminating method of claim 20, further comprising the following steps:

defining the fault-eliminating action corresponding to the combined layer, wherein the fault-eliminating action corresponding to the combined layer consists of a plurality of fault-eliminating actions corresponding to the at least one disabled layer and the target layer in an ascending order of the fault dependencies of the at least one disabled layer and the target layer.

* * * * *